United States Patent [19]
Sato et al.

[11] Patent Number: 5,750,953
[45] Date of Patent: May 12, 1998

[54] MOTOR-DRIVEN X-TYPE RESISTANCE SPOT WELDING GUN

[75] Inventors: Yoshio Sato; Keiji Kameta, both of Kanagawa, Japan

[73] Assignee: Dengensha Manufacturing Company Limited, Kanagawa, Japan

[21] Appl. No.: 701,953

[22] Filed: Aug. 23, 1996

[30] Foreign Application Priority Data

Aug. 25, 1995 [JP] Japan .................... 7-240858

[51] Int. Cl.$^6$ .................................................. B23K 11/00
[52] U.S. Cl. .................................................. 219/90
[58] Field of Search ........................ 219/86.21, 86.23, 219/86.24, 86.25, 86.33, 86.41, 86.7, 90

[56] References Cited

U.S. PATENT DOCUMENTS

| | | | |
|---|---|---|---|
| 4,531,041 | 7/1985 | Larson | 219/90 |
| 4,551,605 | 11/1985 | Numata et al. | 219/86.31 |
| 4,559,438 | 12/1985 | Nakadate | 219/90 |
| 4,771,160 | 9/1988 | Pitsch et al. | 219/90 |
| 5,252,801 | 10/1993 | Angel et al. | 219/86.61 |

FOREIGN PATENT DOCUMENTS

| | | | |
|---|---|---|---|
| 0 417 687 | 3/1991 | European Pat. Off. | B23K 11/31 |
| 2 652 024 | 3/1991 | France | B23K 11/28 |
| 3207580 | 9/1991 | Japan | B23K 11/11 |
| 7236981 | 9/1995 | Japan | B34K 11/11 |
| 825057 | 1/1996 | Japan | B23K 11/11 |
| 2 261 081 | 5/1993 | United Kingdom | B23K 11/11 |
| 2 280 135 | 1/1995 | United Kingdom | B23K 11/11 |

OTHER PUBLICATIONS

Patent Abstracts of Japan, vol. 96, No. 1, 31 Jan. 1996, & JP-A-07 236981 (Dengensha Mfg. Co. Ltd.) 12 Sep. 1995, *Abstract.

*Primary Examiner*—Matthew V. Nguyen
*Attorney, Agent, or Firm*—Sughrue, Mion, Zinn, Macpeak & Seas, PLLC

[57] ABSTRACT

A motor-driven X-type resistance spot welding gun. A servo-controlled motor torque is converted into force to drive gun arms and into electrode force by using a reduction gear without converting rotational output of the motor into rectilinear motion. The two arms are respectively attached to an output shaft of the reduction gear or a case, and the rotational output of the motor can be converted into swingwise movement to close and open the arms. The electrode tips on the arms nip a workpiece to apply electrode force to the workpiece, and current is passed through the workpiece to perform spot welding. A motor, a reduction gear and the like are assembled on a common base to form a driving unit so that an arm actuator for the X-type resistance spot welding gun is formed. The same driving unit can be used commonly to various X-type gun models. The independent properties of functions of a bracket for attaching the welding gun to a robot are improved. Since properties of the arm actuator and the bracket are not dependent on a welding unit of the gun (portion through which welding current flows), the production cost for a manufacturer and maintenance cost for a user are reduced.

7 Claims, 5 Drawing Sheets

MOTOR-DRIVEN X-TYPE RESISTANCE SPOT WELDING GUN

BACKGROUND OF THE INVENTION

The present invention relates to a motor-driven X-type resistance spot welding gun which uses an electric motor to actuate gun arms.

Conventionally, an air cylinder is often used as an actuator. A gun using an air cylinder has been shown since a time when resistance spot welding guns were first manufactured.

In a conventional X-type welding gun actuated with the air cylinder, one of two arms is connected at an arm end thereof to a piston rod and the other is connected at an arm end thereof to a cylinder body, respectively via a rotating hinge.

In this conventional mechanism, the air cylinder actuates two arms to open and close with swinging-wise motion around a main hinge at which these arms are assembled in an X-type fashion. Thus, when one of the two arms is fixed, the other moves, which means that both of the arms do not move independently.

The conventional welding gun nips a workpiece with two electrode tips therebetween by the above motion of electrode-carrying arms. Once sufficient electrode force is applied, current is passed through the workpiece so as to form a melting spot in the workpiece, and thus a spot weld is obtained.

It is well-known that the main hinge described above must be provided with a mechanism to allow rotation for every welding and a means to insulate between the arms, that the main hinge must be well protected from welding splash, and that the main hinge must have sufficient durability.

However, even if the rotary portion of the main hinge is provided with a cover to protect against welding splash which includes fine iron particles generated from a spot weld, the rotary portion is easily consumed, because the welding splash is so fine that it easily enters into the rotary portion. The conventional X-type welding gun actually loses the alignment of upper and lower electrode tips within one or two years according to a production amount, because the looseness of the main hinge can easily affect the alignment of the tips which are located on the ends of arms remote from the main hinge.

A conventional motor-driven X-type welding gun is disclosed in Japanese Patent Unexamined Publication No. Hei. 3-207580, which is equivalent to France Patent FR 89-12344. In this motor-driven X-type welding gun, one of two gun arms is connected at an arm end to an output shaft of an electric motor through a rotating hinge and via a screw mechanism which converts rotational movement from the motor to linear movement, and the other gun arm is connected to a rotating hinge mounted on a motor stator (casing) via another rotating hinge which is a main hinge. The two gun arms are assembled with the main hinge to form gun arms in X-type fashion.

The above-mentioned conventional motor-driven X-type welding gun, in which an air cylinder is replaced by a motor with servo control, has no change in the basic construction compared with the conventional X-type air-cylinder-actuated spot welding gun.

Recently, for the motion of the motor-driven X-type welding gun, customers have requested guns in which only one gun arm is driven or both the gun arms are independently driven according to the application of the guns.

However, in the above-mentioned conventional motor-driven X-type welding gun, the two arms do not move independently from each other, as is also the case for the conventional X-type air-cylinder-actuated welding gun. Therefore, it is necessary for a supplier to re-design the basic construction of the gun to meet such requirements.

As the motor-driven X-type welding gun has a tendency to be higher in cost, generally speaking, than the X-type air-cylinder-actuated welding gun, it is impossible to make the same improvements to the X-type welding gun as the conventional air-cylinder-actuated welding gun. Further, the construction as suggested in the motor-driven X-type welding gun as disclosed in the above-mentioned Japanese publication is not rational from an economical point of view. Further, the motor-driven X-type welding gun as disclosed in the above-mentioned Japanese publication has the following problems.

The conventional main hinge at which gun arms are assembled in an X-type fashion is still used, and the rotational output of a motor is converted into rectilinear motion by a ball screw and a nut to actuate the gun arms. The main hinge and the ball screw are easily damaged by welding splash. It is inevitable that welding splash enters inside such rotating portions during long periods of operation.

Transmission efficiency of motor power is low in this construction because motor torque is converted into rectilinear motion and transmitted to gun arms through an intricate mechanism.

The ball screw rotates at high speed, so that the grease may be scattered. It is difficult to always keep sufficient lubrication. For these reasons, the actual lifetime of the motor-driven X-type welding gun as disclosed in the above-mentioned Japanese publication rarely reaches the design lifetime thereof.

In addition to the above described problems, a motor body is extended rearward and interferes with a robot wrist. To avoid this, the face of a bracket where the gun is installed on a robot must be extended rearward. As a result, the distance between the center of gravity of the gun and the rotation center of the robot wrist becomes long, so that the robot receives a heavier load on its wrist.

SUMMARY OF THE INVENTION

To solve the above problems, the present invention is constructed as follows. A motor-driven X-type resistance spot welding gun of this invention uses an electric motor and a reduction gear to actuate gun arms, instead of an air cylinder and ball screw. Therefore, servo controlled motor torque can be converted into a force to actuate the gun arms and a welding force without converting the rotational output of the motor into rectilinear motion.

That is, the rotational output of a motor is transmitted to an input shaft of a reduction gear through a belt and gear which also function as a type of reduction gear and may be omitted if necessary.

The two gun arms are attached either to an output shaft of the reduction gear or a casing respectively, and then the gun arms can be actuated in a swing-wise motion which makes the gun arms open and close without converting rotation of a motor into rectilinear motion. Therefore, the two arms having electrodes (electrode-carrying arms) can nip workpieces with electrode tips. Once sufficient electrode force is applied to the workpieces, current is passed through the workpieces so as to form a melting spot in the workpieces, and thus a spot weld is obtained.

The other point of this invention is to construct a driving unit which comprises a motor, a belt and gears which may be omitted if necessary, and a reduction gear on a common base. By making the actuating apparatus of the gun arms form one driving unit, this driving unit can be separated from other functional portions of an X-type spot welding gun, that is, a welding-current-conducting portion called a welding unit including gun arms, a welding transformer, secondary conductors and so on.

The two gun arms in the welding unit are attached either to an output shaft of the reduction gear or a casting, respectively, and the arms are actuated in a swing-wise motion around a center of the output shaft of the reduction gear. Therefore, the main hinge which always exists in a conventional X-type welding gun is not provided. The reduction gear has a construction of gears combined in a steel casing, so that the welding gun of this invention is absolutely free from the problems in the main hinge of a conventional X-type welding gun with respect to welding splash. The reduction gear is well lubricated with grease contained in a gear box, so there is no lubrication problem and a sufficiently long lifetime can be expected.

The gun of the invention can be assembled and disassembled since the driving unit and the welding unit are independent from each other. The independence of these units also means that there is no interference between them in operation.

It is well known that in a conventional air cylinder-actuated X-type gun the cylinder and other actuating portions must be redesigned according to a stroke of gun-arm-opening because each functional part for actuating gun arms and other parts are constructed so as to be affected by each other. This is also true for the motor-driven gun disclosed in the above-mentioned Japanese publication.

In the welding gun of this invention, the same driving unit can be used for welding guns which have different requirements on a stroke of gun-arm-opening, because the driving unit is servo controlled in position which means the driving unit can position electrode tips on ends of gun arms as required irrespective of the length of the gun arms.

A bracket which is assembled in a welding gun is necessary to install the gun on a robot, as an interface mechanical part between them. The bracket is assembled in upward, downward, or lateral posture, or some intermediate posture therebetween with respect to the gun. In a conventional gun, the bracket must be designed and manufactured according to the installing direction of the welding gun on a robot for both the conventional air cylinder-actuated gun and the motor-driven gun as disclosed in the above-mentioned Japanese publication, even for the same gun model.

The bracket of the welding gun of the invention is of a cantilever type in which the bracket is attached by bolts to only one side of a casing of the reduction gear or a gun arm for example. Thus, the welding gun of the present invention enables the bracket to be standardized irrespective of the direction and posture of the welding gun. In other words, the bracket of the invention can be assembled in the gun in any direction necessary for the direction and posture of the gun when the gun is installed on a robot.

Since the gun functions independently of the bracket, functions intrinsic to the bracket are strengthened, which is comparable to making an actuating apparatus of the gun arms independent as the driving unit or making a welding-current-conducting portion independent as the welding unit.

When spot welding is performed, in the welding gun attached to a robot, electrode tips on the ends of the gun arms must be positioned at a welding point.

Since the electrode tips include an upper one and a lower one, one of the electrode tips is determined as positioning one. The gun arms perform a closing operation to nip a workpiece. It is convenient to use the electrode tip of one gun arm not performing a swing-wise motion, as the positioning electrode tip used by the robot.

The gun arm not performing the swing-wise motion is called a fixed arm, and the gun arm performing the swing-wise motion is called a driven arm.

As described before, the two gun arms are fixed to an output shaft of the reduction gear or a casing. However, in this respect, it is impossible to differentiate the fixed arm from the driven arm. The difference between the fixed arm and the driven arm is caused by connection to the bracket.

On the other hand, the bracket can be connected to both the output shaft of the reduction gear and the casing, or in some case, may be connected to gun arms through bearings. For example, it is assumed that the bracket is directly attached to the casing of the reduction gear. Since the bracket is attached to the robot, the arm attached to the casing of the reduction gear is attached to the robot through the bracket.

The gun arm attached to the casing of the reduction gear serves as the fixed arm, the robot performs positioning to a welding point by a top end of the electrode tip on the tip of the fixed arm, and the driving unit drives the gun arm attached to the output shaft of the reduction gear.

It is assumed that the robot positions the top end of the electrode tip of the fixed arm to a position where the end does not come in contact with the workpiece to provide a gap. Even if the driven arm presses the workpiece, if the respective rigidities of the robot arm, gun and workpiece are large, the driven arm presses the workpiece while the top end of the electrode tip of the fixed arm is not brought into contact with the workpiece. That is, in this state, the workpiece is not nipped with the electrode tips.

Practically, deformation occurs in each of the robot arm, gun and workpiece so that such an extreme case rarely occurs. However, it can occur by a positioning error of the robot, a positioning error of the workpiece (error caused from the position of the workpiece which is not necessarily constant), deformation of the gun arm or the like.

The problem in this case is that although it is not the above-mentioned extreme phenomenon, suitable electrode force is not applied to the workpiece from the electrode tips on both the gun arms so that high quality welds can not be obtained.

In this case, when the driven arm presses the workpiece, in addition to the positioning of the robot, it is necessary to provide a mechanism for automatically correcting the position of the fixed arm by using reaction force generated at the driven arm. This mechanism of the spot welding gun is well known as an equalizing mechanism in this art.

The gun of the present invention is equipped with this equalizing mechanism. The bracket is not directly connected to the output shaft of the reduction gear or the casing but is connected through bearings, and a mechanism is provided by which the entire bracket and the gun can be freely rotated. Further, stopper means is provided for restricting the rotation within a range, and a spring is provided for pressing the gun to one direction in the rotatable range.

The entire gun performs the equalizing motion within the rotatable range allowed by the stopper by reaction force generated at the gun arm when the electrodes nip the workpiece to apply force.

Further, by using the driven unit of the present invention to drive the fixed arm, it is possible to perform the equalizing motion.

In the above example of the welding gun in which the equalizing mechanism is not provided, the driven arm is attached to the output shaft of the reduction gear of the driving unit, the fixed arm is attached to the casing of the reduction gear, and further the casing and the fixed arm are attached to the bracket. In this example, if the already used driving unit is called a first driving unit, a second driving unit may be intervened between the bracket and the fixed arm.

A casing of a second reduction gear on a second driven unit is attached to the bracket attached to the robot. An output shaft of the second reduction gear is attached to the fixed arm. Since the fixed arm in the above example supports the first driving unit through the casing of the first reduction gear on the first driving unit, the second driving unit supports the entire gun through the fixed arm on the output shaft of the second reduction gear from the bracket.

The second driving unit is arranged to perform positioning of the fixed arm so that the equalizing motion can be performed. At this time, the first driving unit controls the driven arms.

DETAILED DESCRIPTION OF THE INVENTION

Figure 1:
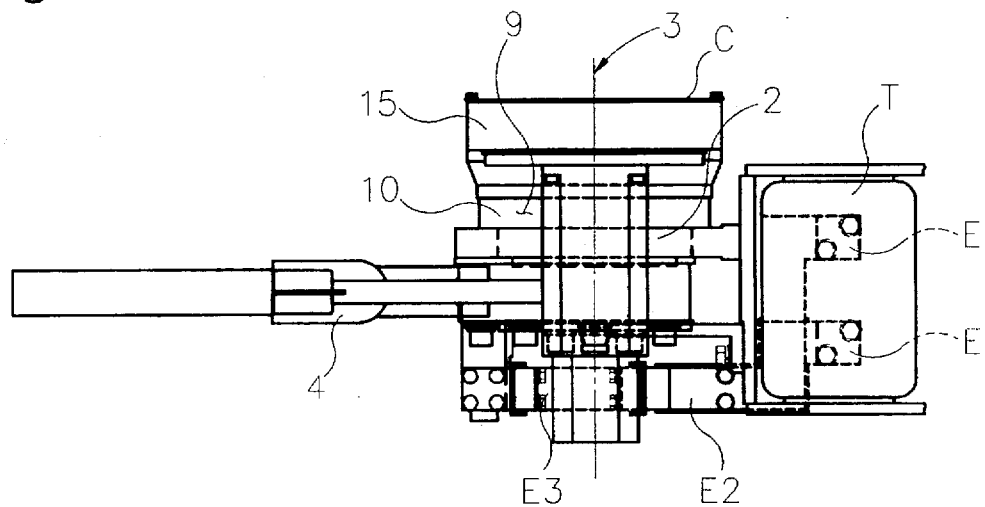
FIG. 1 is a plan view showing a robot welding gun of an X-type into which a driving unit according to an embodiment of the present invention is incorporated.
Figure 2:
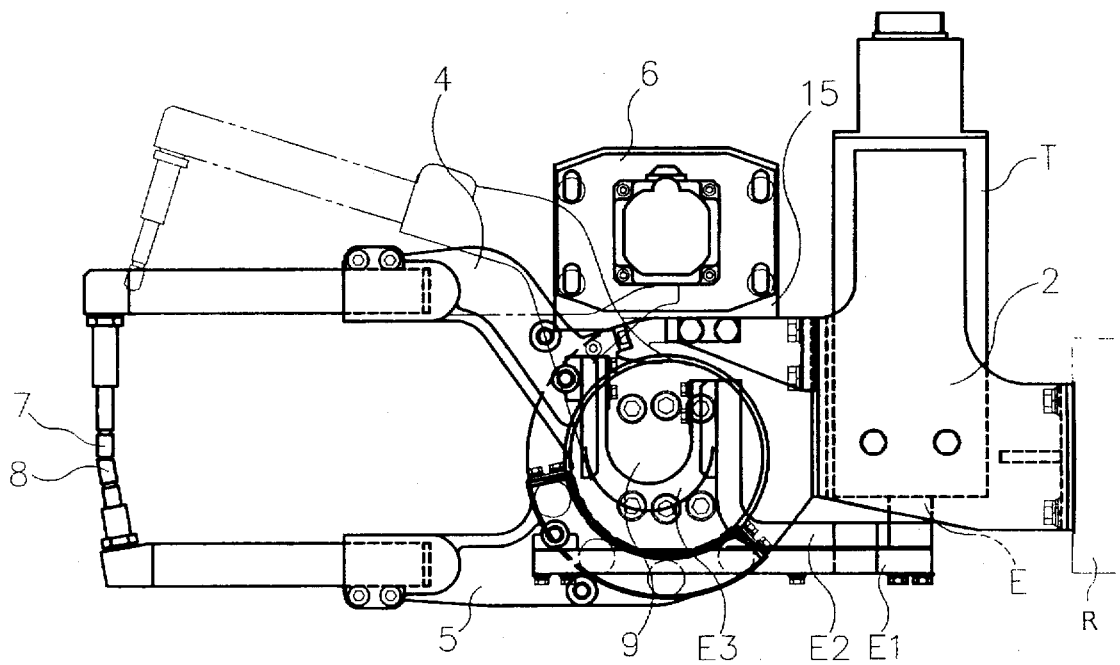
FIG. 2 is a front view of the robot welding gun of FIG. 1.
Figure 3:
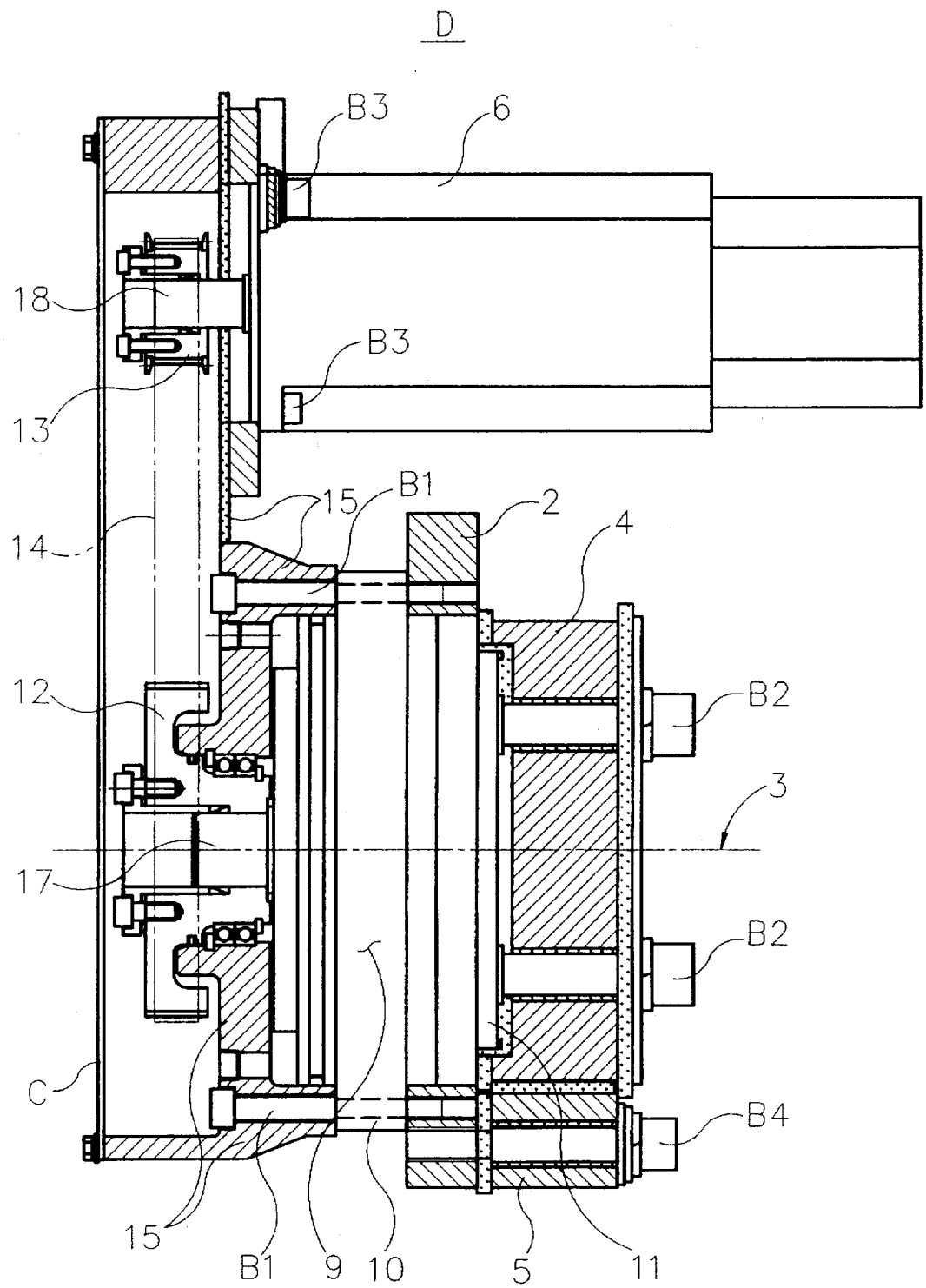
FIG. 3 is a sectional view of a driving unit showing in detail a construction of the driving unit of the invention in which an equalizing mechanism is not provided.

FIG. 1 is a plan view showing a welding gun which is an embodiment of the present invention. FIG. 2 is a front view of the welding gun shown in FIG. 1. FIG. 3 is a sectional view of a driving unit, as seen from the lower side of the views of FIGS. 1 and 2, showing in detail an arrangement of a driving unit according to the present invention.

In FIGS. 1 to 3, the welding gun is attached to a robot R by a bracket 2. A welding transformer T is also attached to the bracket. Arms 4 and 5 perform swing-wise motion to close and open electrode tips 7 and 8 around an output shaft center 3 of a reduction gear 9. This pair of arms 4 and 5 are connected to each other through a pair of output terminals E, E of the welding transformer, secondary conductors of bus bar E1 and E2, and a flexible shunt E3.

In a driving unit D, a motor 6 is attached to a common base 15 by bolts B3, and a casing 10 of the reduction gear 9 is attached by bolts B1. In the embodiment, speed reduction means (which may be omitted) comprised of a toothed belt 14 and gears 12 and 13 is provided between an output shaft 18 of the motor 6 and an input shaft 17 of the reduction gear 9. For safety, a cover C is provided. The arm 5 is attached to the bracket 2 by a bolt B4 in an insulating state. The case 10 of the reduction gear 9 is attached to the bracket 2. The other arm 4 is attached to an output shaft 11 of the reduction gear 9 by bolts B2.

The bracket 2 is attached to the casing 10 of the reduction gear 9 so that it is concentric with the output shaft center 3 of the reduction gear 9 and can be freely positioned therearound in the range of 360 degrees. Accordingly, the bracket 2 can be attached to the robot R so that attaching directions (attaching postures) of the gun to the robot R can be an upward posture, a downward posture, or a lateral posture (posture shown in FIG. 2), or an intermediate posture among them. That is, the arm 5 is fixed to the casing 10 of the reduction gear 9, and the casing 10 of the reduction gear 9 is fixed to the bracket 2, so that the arm 5 is a gun arm fixed to the robot R.

In this case, the two gun arms perform swing-wise motion in which the arm 4 relative to the arm 5 closes and opens the electrodes 7 and 8 around the output shaft center 3 of the reduction gear 9. That is, the arm 5 is a fixed arm and the arm 4 is a driven arm.

In order to certainly bring a top end of an electrode tip 8 of the fixed arm 5 into contact with the lower side of a workpiece, the robot R positions the gun at a position slightly lifted. Thereafter, the arm 4 is driven and electrode force is applied to the workpiece to be welded.

Figure 4:
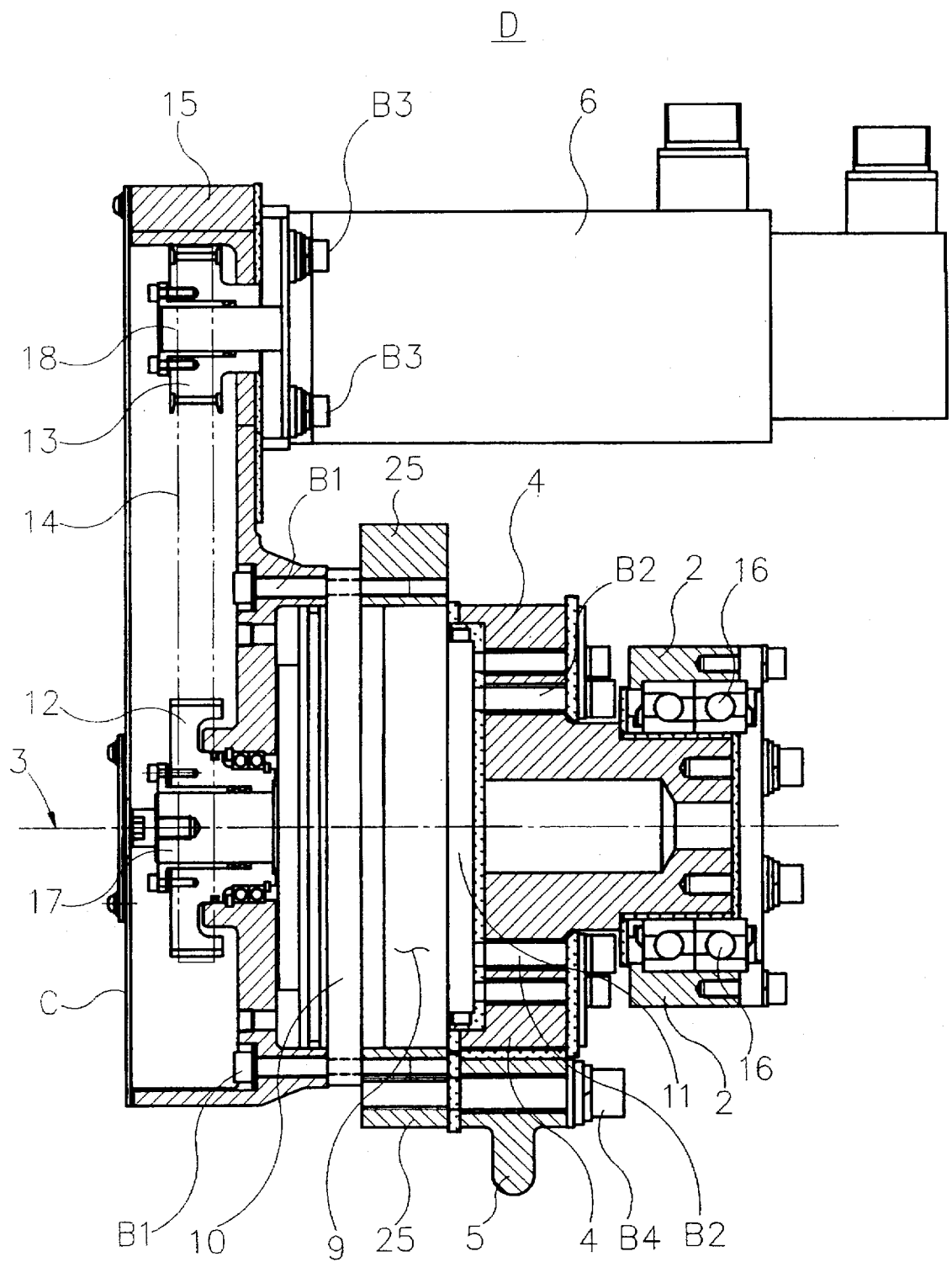
FIG. 4 is a sectional view of another embodiment of the invention provided with an equalizing mechanism, in which a welding gun is installed on a robot with a bracket via bearings which allows the gun to move to compensate for an error of a few millimeters, which may be formed by a positioning error of a workpiece and a robot. This is a kind of self compensation function (self alignment for positioning error) usually called as equalizing motion of a welding gun.
Figure 5:
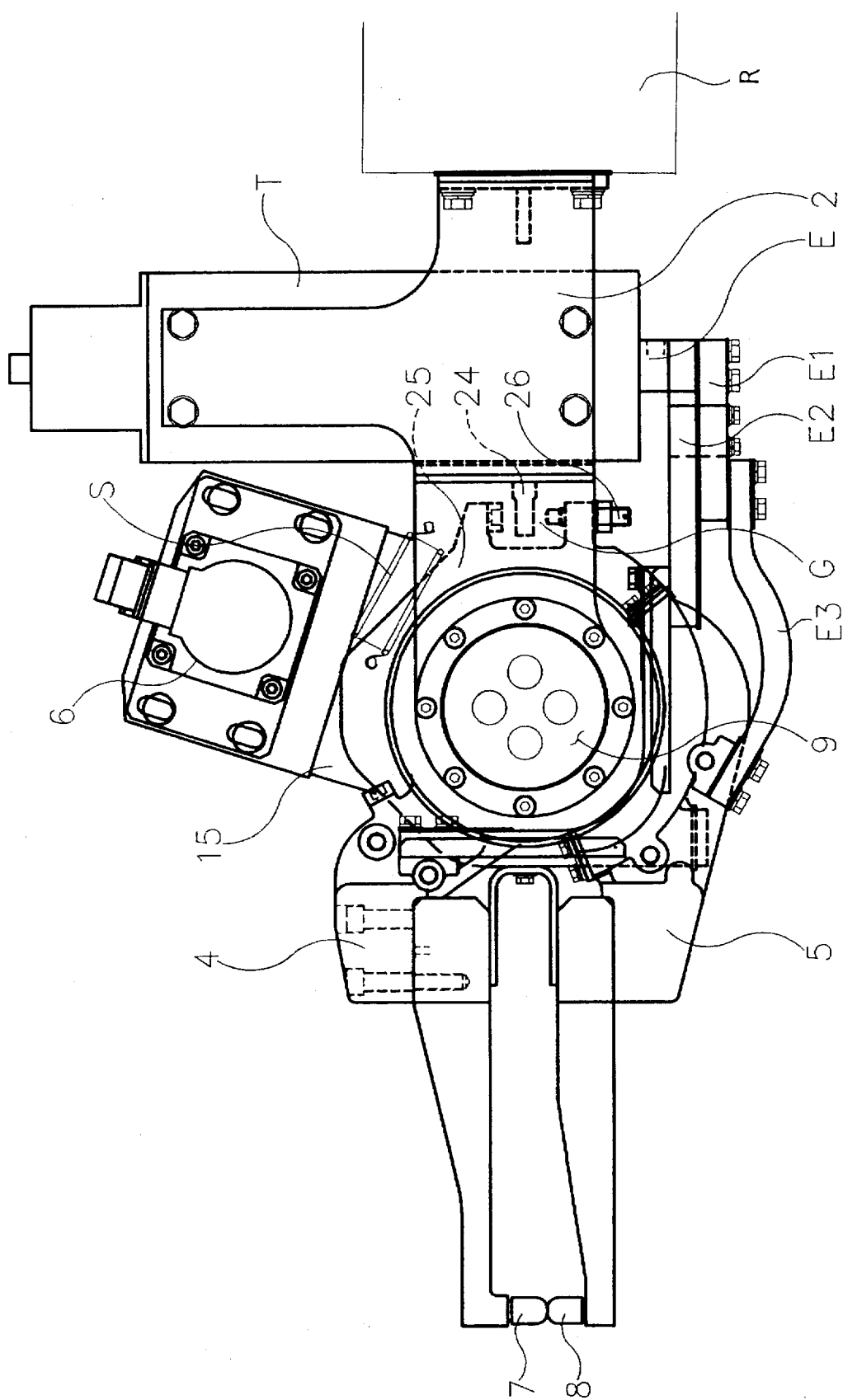
FIG. 5 is a front view of the welding gun of FIG. 4.

FIGS. 4 and 5 are sectional views of another embodiment of the invention, in which a welding gun is installed on a robot with a bracket 2 via bearings 16 so that an equalizing mechanism with a spring is provided to compensate for positioning errors which may be formed between a workpiece and a robot in the range of several millimeters.

In FIGS. 4 and 5, the bracket 2 is attached to an arm 4 through bearings 16. The bearings 16 are attached to the arm 4 concentrically with the output shaft center 3 of the reduction gear. Accordingly, the bracket 2 together with a stopper 24 can be positioned at any position in all directions of 360 degrees around the output shaft center 3 of the reduction gear.

In order to restrict the direction of the bracket 2, a positioning stopper ring 25 fixed to the casing 10 of the reduction gear 9 is used. The arm 5 is fixed to the stopper ring 25 by bolts B4 in an insulated state. The positioning stopper ring 25 is also attached to the casing 10 of the reduction gear concentrically with the output shaft center 3 of the reduction gear, and a position of a positioning stopper 26 provided on the positioning stopper ring 25 can be rather freely positioned in all directions of 360 degrees. The positioning stopper ring 25 may be attached to the output shaft 11.

The positioning stopper 26 is attached to the positioning stopper ring 25 in an adjustable manner. Thus, by the stopper 24 provided on the bracket 2 and the positioning stopper 26, the attaching direction of the gun (attaching posture) to the robot R can be an arbitrary posture such as an upward posture, a downward posture, or a lateral posture, or an intermediate posture therebetween.

A gap G of several mm is provided between the positioning stopper 26 and the stopper 24. A force is applied to open the gap G between the positioning stopper 26 and the stopper 24 by a spring S attached between the positioning stopper ring 25 and the bracket 2. The gap G of several mm always exists between the positioning stopper 26 and the stopper 24 until the gun applies electrode force by nipping a workpiece.

Reaction force which may be generated on gun arms when electrode force is applied on a workpiece while nipping it by electrode tips, can be absorbed by the function of the spring S and the gap G. This is a so-called equalizing motion.

Figure 6:
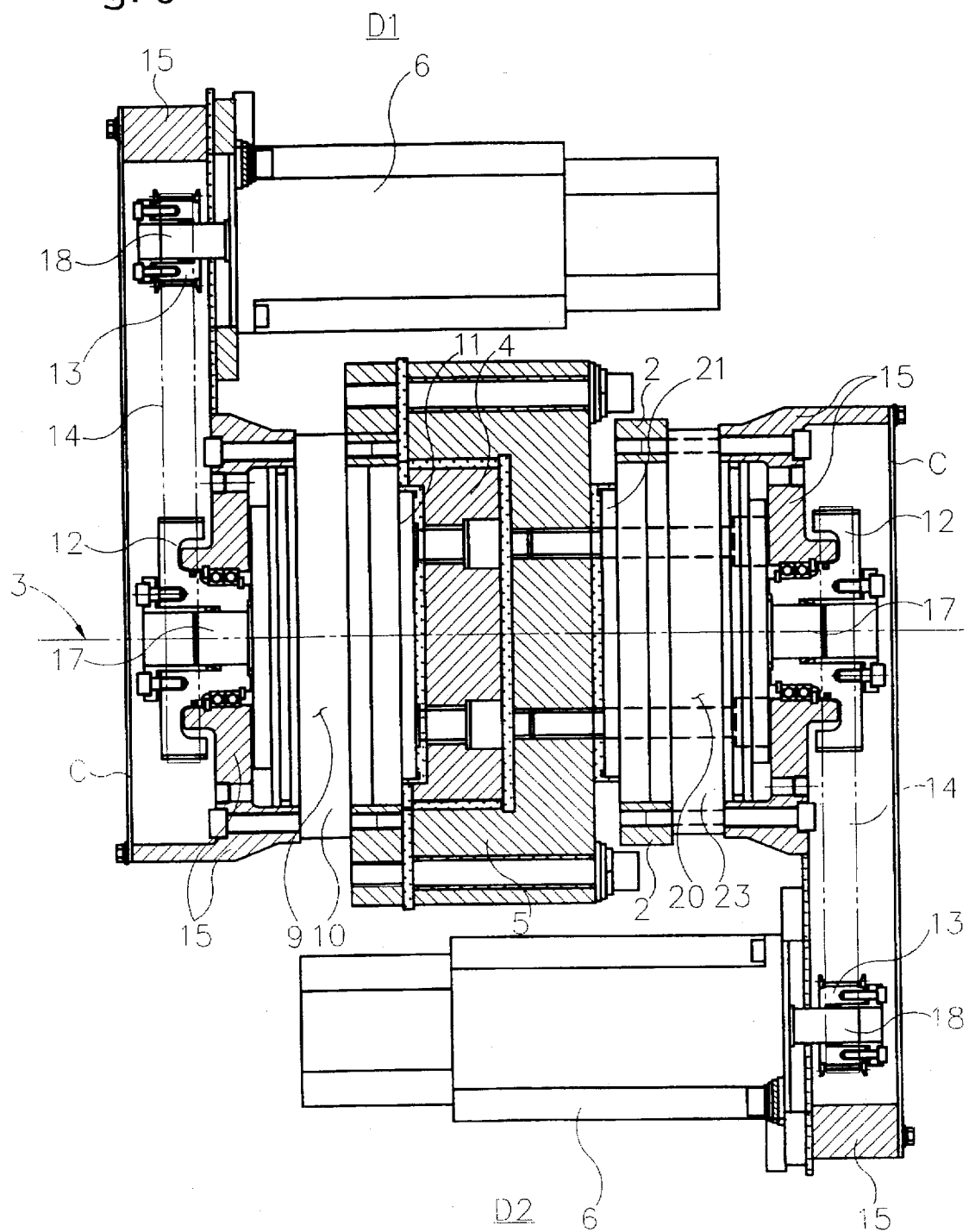
FIG. 6 is a sectional view of still another embodiment of the invention, provided with two driving units, in which two similar driving units are provided for two gun arms so that the respective gun arms can be independently driven, though in practical operation of welding gun, one unit is used for driving one gun arm and the other unit is used for correcting positioning of the entire welding gun when applying electrode force to a workpiece, that is, for equalizing motion.

FIG. 6 is a sectional view showing still another embodiment of the present invention.

In FIG. 6, two driving units are provided so that two gun arms can be independently driven. A gun arm 4 is attached to an output shaft 11 of a reduction gear 9 in a first driving unit D1, and a gun arm 5 is attached to a casing 10 of the reduction gear 9.

An output shaft 21 of a reduction gear 20 in a second driving unit D2 is attached to the gun arm 5 attached to the casing 10 of the reduction gear 9. A casing 23 of the reduction gear 20 is fixed to a bracket 2. That is, the driving unit D2 is mounted on the bracket 2 through the casing 23 of the reduction gear 20, and the output shaft 21 of the reduction gear 20 is attached to the gun arm 5.

Accordingly, the entire gun can perform swing-wise motion around the center 3 of the output shaft 21 of the reduction gear 20 (which is the same as the center of the reduction gear 9) by the driving unit D2. Thus, the entire gun can be positioned. That is, the driving unit D1 serves as an actuator for the movable arm 4, and the driving unit D2 positions the arm 5 by servo control. That is, by reaction force at the press of the workpiece, the driving unit D2 corrects the position entire of the gun. An equalizing operation can therefore be performed.

In the X-type spot-welding gun of the present invention, the functions thereof are classified as follows:

(A) Driving unit; functions to control opening and closing operation of the gun arm and to generate electrode force;

(B) Bracket; the functions are classified as follows:
  (a) functions to attach the gun to the robot.
    (1) function by which the bracket holds the gun;
    (2) function by which the bracket is attached to the robot.
  (b) Functions to determine attaching posture of the gun to the robot.

(C) Welding unit; general name for portions other than described above. Functions to conduct welding current.

The driving unit can be made into a standardized unit irrespective of the shape of other functional portions. Also, as for the function "(B)(a)(1) above, this the function can be satisfied irrespective of the shape of the welding unit or gun arms contained thereon as well as the driving unit.

However, in order to satisfy the function (B)(a)(2) above function, it is necessary to make a robot attachment portion of the bracket into a shape which is required by the robot to which the bracket is attached. However, this is satisfied by making a standard shape of the bracket in accordance with an attachment shape of a robot made by robot makers, so that this does not damage the standardization of the bracket. Further, the function (B)(b) above is satisfied at the same time as function (B)(a).

As for the gun arms in the welding unit", it is necessary that they have a shape that corresponds to the shape of the workpiece to be welded by the gun. However, although this means that parts relating to the shape of the workpiece, that is, peripheries around electrode tips on the ends of the gun arms must have various shapes, parts to be connected to the driving unit" can be made to have a constant shape. This is also useful for standardization of the driving unit".

Further, the X-type spot welding gun of the present invention has the following effects:

1. The X-type welding gun of the present invention has no main shaft which is apt to be easily worn and has existed in a conventional X-type spot welding gun using an air cylinder or the motor-driven X-type spot welding gun as disclosed in the above-mentioned Japanese publication. In the present invention, the central mechanism of swing-wise motion of the gun arms is not the main shaft but rather the reduction gear in the driving unit.

Since the reduction gear is a completely sealed structure, welding splash does not enter into the reduction gear. Further, since grease is contained to achieve sufficient lubrication, the consumption which occurred in the conventional main shaft, does not occur in the reduction gear. Accordingly, misalignment of the electrode tips at arm ends hardly occurs.

Also, contrary to the conventional motor-driven gun, since a ball screw which is negatively affected by welding splash and may have a problem in lubrication is not used, the driving unit of the present invention as a gun arm actuating apparatus is not influenced by the frequency of use of the gun or the operation environment. Accordingly, the design lifetime is almost equal to the practical lifetime.

2. In the motor-driven gun using the ball screw as disclosed in the above-mentioned Japanese publication, the motor protrudes behind the gun. On the other hand, the present invention has no such defect. Even if the gun arm is opened to a large extent, there is nothing moving behind the gun. Thus, the distance between the robot attachment surface of the bracket and the center of gravity of the gun becomes small. As a result, even if the gun is made large and the weight is increased, it becomes easy to make the gun without exceeding the allowable torque of the robot.

3. Various shapes of the gun arms are required for applications of the gun. Also, there are various demands for an opening blank of the gun arm (opening amount of arms, amount of separation between electrode tips). For those demands, the same driving unit can be used in the present invention.

That is, since the standardized driving unit is assembled to the gun arms having the shape in accordance with the request of a user, it is sufficient for the gun user only to prepare several driving units for maintenance spare parts for various guns.

Further, irrespective of the posture of the gun attached to the robot, the same bracket can be used. Accordingly, when the user wants to change the attachment posture of the gun, a new bracket is not necessary as is the case with the conventional apparatus.

Since the X-type spot welding gun of the present invention contributes to a large reduction of maintenance cost which can not be realized by a conventional welding gun, a large economical effect can be obtained for a user.

When the electrode force necessary for a gun is large, and when the rate of use (duty cycles) of the gun is large, it is necessary to increase the rank of motor power in the driving unit. However, in the case of the X-type welding gun used in a normal welding line for automobile body manufacturing, one kind of motor power is sufficient.

The variety of guns cause problems of production cost for a manufacturer and maintenance cost for a user. The motor-driven X-type resistance spot welding gun of the present invention, improves on the conventional technical concept represented by the conventional air cylinder actuated X-type gun which has the above problems, and also improves on the motor-driven X-type gun as disclosed in the above-mentioned Japanese publication. The new technical concept explained with respect to the motor-driven X-type resistance spot welding gun of the present invention can make large improvements in the cost and lifetime of the X-type welding gun by standardizing the respective gun functions.

What is claimed is:

1. A motor-driven X-type spot welding gun, comprising:
   a first driving unit including:
      a first reduction gear rotatably coupling two gun arms around a center of an output shaft of said first reduction gear;
      a motor to generate a torque for electrode force, said first reduction gear transmitting the torque to electrodes of said gun arms; and
      a common base on which said motor is mounted, said common base being removably set to a casing or the output shaft of said first reduction gear.

2. The welding gun according to claim 1, further comprising a bracket for attaching the gun to a robot, said bracket directly supporting the casing or the output shaft of said first reduction gear in a cantilever manner, said bracket being attached concentrically with the center of the output shaft of said first reduction gear so that said bracket is freely positioned with respect to the gun irrespective of a posture of the gun to be attached to a robot.

3. The welding gun according to claim 1, further comprising:
   a bracket for attaching the gun to a robot, said bracket supporting one of said gun arms through bearings, whereby equalizing motion of the gun is made possible; and
   positioning means for freely positioning said bracket to the gun irrespective of a posture of the gun installed on the robot.

4. The welding gun according to claim 2, further comprising a second driving unit including a second reduction gear fastened to said bracket and a common base, wherein said common base is removably set to a casing or an output shaft of said second reduction gear which enables the welding gun to perform swing-wise motion.

5. The welding gun according to claim 3, further comprising a second driving unit including a second reduction gear fastened to said bracket and a common base, wherein said common base is removably set to a casing or an output shaft of said second reduction gear to thereby allow the welding gun to swing-wise motion.

6. A motor-driven X-type spot welding gun, comprising:
   a driving unit including:
      a reduction gear rotatably coupling together two gun arms around a center of an output shaft of said reduction gear; and
      a motor to generate a torque for electrode force;
   wherein one of the gun arms is fastened to the output shaft of said reduction gear and the other is connected to a casing of said reduction gear.

7. The welding gun as claimed in claim 3, wherein said positioning means comprises:
   a positioning stopper ring attached to said casing or said output shaft of said reduction gear;
   a positioning stopper attached to said positioning stopper ring;
   a stopper attached to said bracket; and
   a spring provided between said positioning stopper ring and said bracket.

* * * * *